(12) United States Patent
Piqué et al.

(10) Patent No.: US 8,980,380 B2
(45) Date of Patent: Mar. 17, 2015

(54) FABRICATION OF 3-DIMENSIONAL MICRO-ASSEMBLIES

(75) Inventors: Alberto Piqué, Crofton, MD (US); Scott A Mathews, Takoma Park, MD (US); Andrew J. Birnbaum, Washington, DC (US); Nicholas A. Charipar, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 544 days.

(21) Appl. No.: 13/005,610

(22) Filed: Jan. 13, 2011

(65) Prior Publication Data

US 2012/0183702 A1    Jul. 19, 2012

(51) Int. Cl.
| | | |
|---|---|---|
| *B05D 3/00* | (2006.01) | |
| *C08J 7/18* | (2006.01) | |
| *G21H 5/00* | (2006.01) | |
| *B21D 26/14* | (2006.01) | |
| *B23K 26/00* | (2014.01) | |
| *B23K 26/18* | (2006.01) | |
| *B23K 26/38* | (2014.01) | |
| *B23K 26/40* | (2014.01) | |

(52) U.S. Cl.
CPC ............. *B21D 26/14* (2013.01); *B23K 26/0093* (2013.01); *B23K 26/18* (2013.01); *B23K 26/38* (2013.01); *B23K 26/4065* (2013.01)
USPC .......................................................... 427/554

(58) Field of Classification Search
USPC .......................................................... 427/554
See application file for complete search history.

(56) References Cited

U.S. PATENT DOCUMENTS

| | | | | |
|---|---|---|---|---|
| 6,805,839 | B2 * | 10/2004 | Cunningham et al. ...... | 422/82.12 |
| 7,087,523 | B2 * | 8/2006 | Grigoropoulos et al. ...... | 438/662 |
| 2006/0036045 | A1 * | 2/2006 | Wilson et al. ................. | 525/452 |
| 2007/0237676 | A1 * | 10/2007 | Colton et al. ................. | 422/68.1 |

OTHER PUBLICATIONS

Timothy G. Leong, Bryan R. Benson, Emma K. Call, and David H. Gracias, "Thin Film Stress Driven Self-Folding of Microstructured Containers", Wiley interScience, 2008, 4 No. 10, 1605-1609.*

Jingjiao Guan, Hongyan He, Derek J. Hansford, and L. James Lee. "Self-folding of Three-Dimensional Hydrogel Microstructures" The Journal of Physical Chemistry Letters B, (2005) 109, 23134-23137.*

Hyun Jin In, William J. Arora, Paul Stellman, Sundeep Kumar, Yang Shao-Horn, Henry I. Smith, and George Barbastathis. "The Nanostructured Origami™ 3D Fabrication and Assembly Process for nanopatterned 3D structures". Smart Structures and Materials, (2005) 5763. 84-95.*

Andrew S. Holmes, "Laser fabrication and assembly processes for MEMS" Proceedings of SPIE (2001) vol. 4274, 297-306.*

(Continued)

*Primary Examiner* — Dah-Wei D Yuan
*Assistant Examiner* — Kristen A Dagenais
(74) *Attorney, Agent, or Firm* — US Naval Research Laboratory; Joseph T. Grunkemeyer

(57) ABSTRACT

Disclosed herein is a method of: depositing an actuating material onto a bendable component; and applying heat or an electromagnetic force to the actuating material, such that the volume of the actuating material changes, causing the component to bend.

8 Claims, 2 Drawing Sheets

(56) References Cited

OTHER PUBLICATIONS

Seung H Ko, Heng Pan, Costas P Grigoropoulos, Christine K Luscombe, Jean M J Frechet, and Dimos Poulikakos, "All-inkjet-printed flexible electronics fabrication on a polymer substrate by low-temperature high-resolution selective laser sintering of metal nanoparticles", IOP Publishing, Nanotechnology, (2007) 18 1-8.*

William J. Arora, Henry I. Smith, George Barbastathis, "Membrane folding by ion implantation induced stress to fabricate three-dimensional nanostructures.", Microelectronic Engineering, (2007), 84, 1454-1458.*

Hyun Jin In, William J. Arora, Paul Stellman, Sundeep Kumar, Yang Shao-Hor, Henry I. Smith, and George Barbastathis. The Nanostructured Origami(TM) 3D Fabrication and Assembly Process for Nanopatterned 3D structures. 2005 Smart Structures and Materials. (vol. 5763). (pp. 83-95).*

Arora et al., "Membrane folding by helium ion implantation for three-dimensional device fabrication" J. Vac. Sci. Technol. B, 25, 2184-2187 (2007).

Arora et al., "Membrane folding by ion implantation induced stress to fabricate three-dimensional nanostructures" Microelectronic Engineering, 84, 1454-1458 (2007).

Arora et al., "Membrane folding to achieve three-dimensional nanostructures: Nanopatterned silicon nitride folded with stressed chromium hinges" Appl. Phys. Lett., 88, 053108 (2006).

Arora at al., "Nanostructured Origamia 3D Fabrication and Self Assembly Process for Soldier Combat Systems" Tranformational Science and Technology for the Current and Future Force, Proceedings of the 24th US Army Science Conference Orlando, Florida, USA, (Nov. 29-Dec. 2, 2006).

Barbastathis et al., "The Nanostructured OrigamiO 3D Fabrication and Assembly Process" 19th Annual Meeting of the American Society for Precision Engineering (ASPE), Orlando, FL (2004).

Buchner, "Kinematics of 3D Folding Structures for Nanostructured OrigamiO" (2003).

Chen et al., "Q-Enhanced Fold-and-Bond MEMS Inductors" Proceedings of the 3rd IEEE Int. Conf. on Nano/Micro Engineered and Molecular Systems Jan. 6-9, 2008, Sanya, China.

Fleischmann et al., "Self-assembling GaAs mirror with electrostatic actuation using micro-origami" Physica E, 24, 78-81 (2004).

Haasl, "MEMS Fabrication" (2008).

Hui et al., "Single-Step Assembly of Complex 3-D Microstructures" IEEE Thirteenth Annual International Conference on Micro Electro Mechanical Systems Proceedings, 602-607 (2000).

In et al., "Carbon nanotube-based magnetic actuation of origami membranes" J. Vac. Sci. Technol. B, 26, 2509-2512 (2008).

In et al., "Nanostructured Origami• 3D Fabrication and Assembly of Electrochemical Energy Storage Devices" Proceedings of 2005 5th IEEE Conference on Nanotechnology, Nagoya, Japan, Jul. 2005.

In et al., "The Nanostructured Origami• 3D Fabrication and Assembly Process for nanopatterned 3D structures" Smart Structures and Materials 2005: Smart Electronics, MEMS, BioMEMS, and Nanotechnology, Proceedings of SPIE, 5763 (2005).

Jacobsen et al., "Micro-scale truss structures with three-fold and six-fold symmetry formed from self-propagating polymer waveguides" Acta Materialia, 56, 2540-2548 (2008).

Jurga et al., "Nanostructured Origami" Third IEEE Conference on Nanotechnology Proceedings, 220-223 (2003).

La O' et al., "Recent advances in microdevices for electrochemical energy conversion and storage" Internat. J. Energy Res., 31, 548-575 (2007).

Leong et al., "Thin Film Stress Driven Self-Folding of Microstructured Containers" Small, 4, 1605-1609 (2008).

Nichol et al., "Thin membrane self-alignment using nanomagnets for three-dimensional nanomanufacturing" J. Vac. Sci. Technol. B, 24, 3128-3132 (2006).

Ocampo et al., "Characterization of GaAs-based micro-origami mirrors by optical actuation" Microelectronic Engineering, 73-74, 429-434 (2004).

Stellman et al., "Dynamics of Nanostructured Origami" J. Microelectromechanical Systems, 16, 932-949 (2007).

Syms et al., "Surface Tension-Powered Self-Assembly of Microstructures—The State-of-the-Art" J. Microelectromechanical Systems, 12, 387-417 (2003).

Tokuda et al.., "Fabrication and current-drive of SiGe/Si 'Micro-origami' epitaxial MEMS device on SOI substrate" Electron. Lett., 40, 1333-1334 (2004).

Vaccaro et al., "Valley-fold and mountain-fold in the micro-origami technique" Microelectronics Journal, 34, 447-449 (2003).

* cited by examiner (a)

(b)

(c)

*(a)*

*(b)*

US 8,980,380 B2

FABRICATION OF 3-DIMENSIONAL MICRO-ASSEMBLIES

TECHNICAL FIELD

The present disclosure is generally related to fabrication of 3-dimensional micro-assemblies.

DESCRIPTION OF RELATED ART

The ability to manufacture and assemble complex 3D systems via traditional photolithographic techniques has attracted increasing attention. However, most of the work to date still utilizes the traditional patterning and etching processes designed for the semiconductor industry where a 2D structure is first fabricated, followed by some alternative technique for bringing these structures out-of-the-plane. Methods for triggering this out-of-plane folding and assembly exploit several different mechanisms including: residual mechanical stress, surface tension driven assembly, electro-active polymer actuation, thermal/shape memory, and magnetic or electro-static forces. For example, Arora et al., *Appl. Phys. Lett.*, 88, 053108 (2006) discloses depositing chromium thin films and lithographically patterning them into "hinges", which tether one end of the moveable structure to the bulk substrate. When the other end of the structure is released, the residual stress in the Cr film causes out-of-plane bending. Leong et al., *Small*, 4, 1605 (2008) discloses the fabrication of untethered 3D structures from 2D lithographically patterned templates that can be released from their substrate as opposed to traditional approaches that constrain the possible geometries to the plane of the starting wafer. Such un-tethered structures can then be released in solution to perform a specific function, for example, within the context of a micro-fluidic application environment.

The techniques mentioned above all suffer from several common drawbacks. First, since these processes are designed for Si-based substrates, they are constrained to wafer-like form factors, i.e. planar, with relative small processable area (cost of making ever larger wafers becomes prohibitive), which excludes flexible large area (or continuous) sheets or membranes. Second, the deposition and etching processing steps limit the choice of materials to only those that can withstand the required temperatures and etching conditions. A further major drawback is the inability to activate these structures locally, as all the above-mentioned techniques utilize batch fabrication techniques, which limit the designs to parallel processed array structures with control of the activation of the patterned structures to all or none of them, precluding the situation where it might be necessary to only activate a few selected elements within the array. Finally, while photolithography is advantageous from a yield point of view, it suffers from a lack of flexibility, which translates to limitations on the realizable geometries. The overarching challenge is to move away from traditional planar semiconductor photolithographic techniques, which severely limit the type of materials that can be integrated with each other and/or a given substrate.

BRIEF SUMMARY

Disclosed herein is a method comprising: depositing an actuating material onto a bendable component; and applying heat or an electromagnetic force to the actuating material, such that the volume of the actuating material changes, causing the component to bend.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail. All publications and patent documents referenced throughout this application are incorporated herein by reference.

Disclosed herein is a process for the fabrication of 3-dimensional (3D) micro-structures and micro-assemblies on low temperature substrates and other substrates not compatible with traditional photolithographic processing techniques such as polymer films. This process may rely on the use of laser micromachining of 2D patterns, followed by laser transfer, at a specific region on the patterns, of a layer of actuating material, and then laser activation of the actuating material, causing it to shrink, resulting in the folding out-of-plane of the pattern due to strain, in order to generate 3D micro-assemblies.

Some embodiments of the disclosed process may be referred to as the LASER ORIGAMI™ process. The method can be used to generate self-folding 3D microstructures on plastic membranes through the controlled out-of-plane folding of 2D patterns of arbitrary design. This non-lithographic and non silicon-based process is capable of micro-fabricating 3D structures of arbitrary shape and geometric complexity on low temperature substrates. The concept allows for the design and fabrication of arrays of 3D microstructures, where in principle, each microstructure is pre-programmed with the information required to build itself, and ready to be activated, i.e. fold out-of-plane, individually or in batch form. Application of these folded micro-assemblies offers a unique and novel way to develop highly complex yet reconfigurable arrays of 3D microstructures with novel electrical, optical and/or mechanical properties.

Non-lithographic processing techniques such as laser direct-write (LDW) (Arnold et al., *MRS Bulletin*, 32, 32 (2007)) offer a viable alternative for the fabrication of 3D self-folding microstructures. These techniques allow the micromachining of the structure, the deposition of the actuating layer and the controlled activation of each layer to trigger the folding of single or arrayed micro-assemblies. As a result, the ability to sequentially induce folding on non-traditional types of substrates for generating complex and novel arrays of 3D microstructures becomes possible for the first time.

Figure 1:
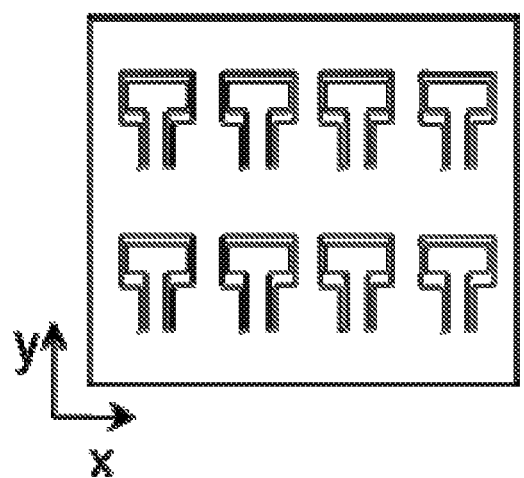
FIG. 1 schematic illustrate the steps of one embodiment for generating 3D micro-assemblies: (a) 2D pattern generation, (b) printing of actuation elements (gray regions), and (c) activation of out-of-plane folding due to strain generated by the actuation elements through shrinkage (gray regions).
Figure 1:
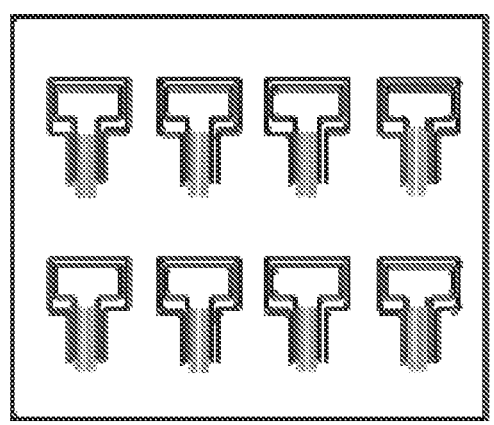
Figure 1:
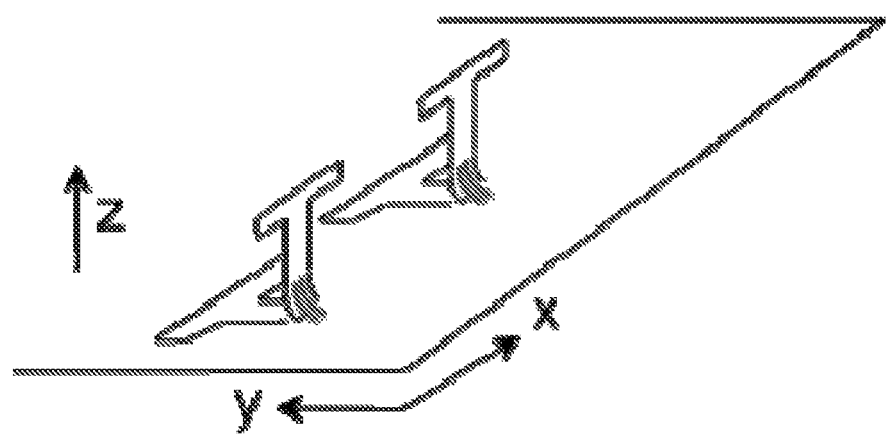

The use of the technique to create and control 3D structures at an individual or batch level on low temperature substrates, such as polymer membranes represents a complete paradigm shift from current approaches. The method may apply LDW techniques to generate the structural elements required for extra-planar elicitation in three simple steps: feature generation via laser microfabrication, selective placement of active elements by laser transfer and out-of-plane folding activation by laser curing. These steps are shown schematically in FIG. 1. Utilization of a single tool (the laser) represents a significant streamlining of the overall process. Moreover, many of the major limitations of the current processes are also addressed, namely processing of large areas, compatibility with non-planar substrates and handling of non-lithography compatible substrates and/or membranes.

An embodiment of the process flow can be described as follows:

The initial 2D designs are laser patterned on a membrane, which can be planar or conforming to a surface.

Active structural elements are then deposited via laser printing in a spatially controlled manner enabling out-of-plane folding with tailored bend radius.

The folding of the out-of-plane patterns along prescribed edges or joints can take place at a designated time, in batch mode (parallel fashion) or for individual patterns (single element actuation possible) using thermal or laser-driven activation, respectively.

The component should be bendable, meaning that it can be folded over a wide range of angles, for example, 10°, 20°, 45°, 90°, 145°, or 180° without failure or undesired deformation. Suitable materials include, but are not limited to, foils, polymer films, and plastic sheeting. The component can be an unattached object, an object on a substrate, or part of a substrate. The component may initially be planar or may already have a three-dimensional configuration. When the component is on a substrate, it may be made by any lithographic or non-lithographic process. There may be a plurality of the components on the substrate arranged in an array or other arrangement. More than one different type of component may be present on the substrate. The component may also have patterns defined on its surfaces and/or subcomponents attached or embedded on its surface.

The component may be a part of the substrate itself. This may be done by partially excising a portion of a bendable substrate from the remainder of the substrate. For example, cutting through the substrate on three sides of a square would produce a square component that may be folded out-of-plane on the fourth side of the square. Any shape may be cut that allows for folding on an uncut edge independently from the remainder of the substrate. An array or other arrangement of such identical or different shapes may be cut in a single substrate. The cutting may be performed by a laser.

Figure 2:
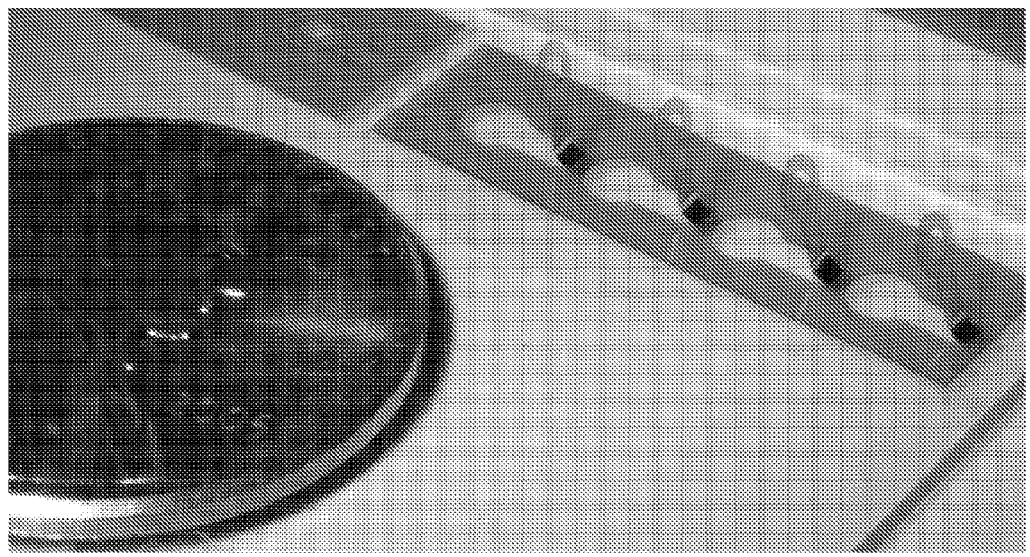
FIG. 2 shows micrographs of prototype folded out-of-plane structures on polyimide membranes. (a) Two membranes at two stages of the process. The 2D micromachined pattern can be seen on the membrane on the top left corner, while the membrane on the right corresponds to a similar structure on which the actuation layer has been deposited and cured to form a 3D micro-assembly. (b) Out-of-plane folding only occurs on those structures with the actuation layer (dark rectangle region), as shown by the pattern on left bottom corner without actuation layer.
Figure 2:
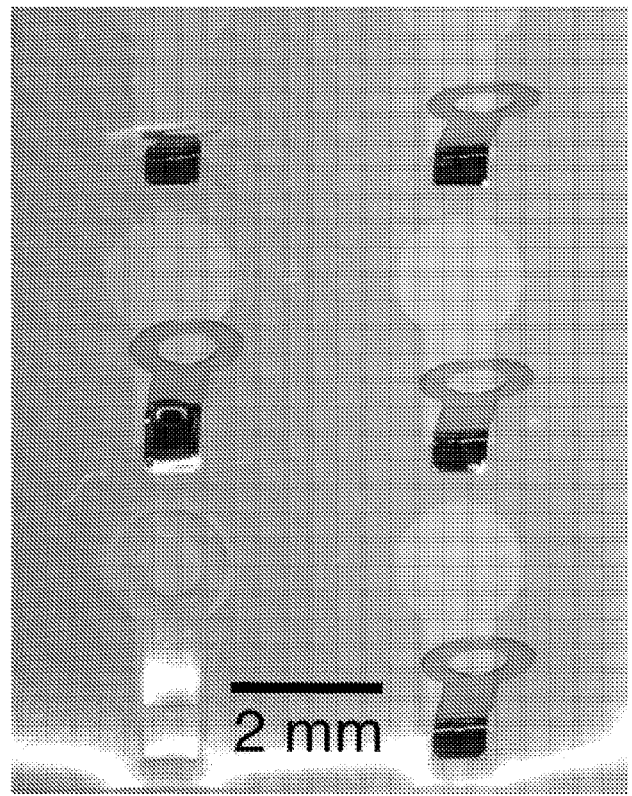

A different approach is also taken with respect to the actuating mechanism, which is based on strain generation through various types of processes such as melt-mediated phase transformations and polymeric cross-linking induced shrinkage. For example, actuation due to volumetric contraction during solvent evaporation of metallic nano-inks has been demonstrated and reduced to practice (FIG. 2). These inks consist of suspended metallic nano-particles in a highly viscous, organic solution. Such an ink containing silver nanoparticles is available from Cabot Corporation as product number CCI-300. The high viscosity enables high-resolution pattern transfer, but also allows for the transfers to conform to non-planar platforms/substrates. After precision transfer, the inks serve as the active layer for out-of-plane manipulation. Local laser curing of the inks serves to evaporate the organics, while simultaneously sintering the metallic nano-particles, causing significant volume shrinkage, which is in turn exploited for out-of-plane folding of the selected components, thus generating the desired 3D microstructures.

The actuating material may be any material that may be placed on the component and which undergoes a change in volume upon application of heat or an electromagnetic force or field. The change in volume may be either shrinkage for concave folding toward the actuating material, or expansion for convex folding away from the actuating material. Heat may cause shrinkage through, for example, evaporation, sintering, and/or polymer crosslinking The ink described above may shrink through evaporation of the solvent and sintering of the nanoparticles. Electromagnetism may effect a volume change through a piezoelectric effect or by use of a magnetic shape memory alloy. Heating may also be used in order to activate traditional (thermally activated) shape memory alloys.

Before placing the material on the component, a score line may be made on the component along the desired folding line. The score line may be made by micromachining, including laser micromachining. Any method of placing the actuating material on the component may be used including, but not limited to, laser transfer such a laser direct write, ink jet printing, micropen dispensing, stamping, screen printing, and other material dispensing or non-lithographic processes.

Any method of delivering thermal energy or electromagnetic force to the material may be used. For example, the component or an array of components may be placed in an oven. It may also be useful to use a delivery method that is capable of heating less than all of a plurality of actuating material deposits on a single substrate. A laser may be used for selective folding of desired components while not affecting the others. Alternatively, the laser may be used to fold all of the components on a substrate, optionally in a predetermined order or sequence.

The folding occurs through a change in volume of the actuating material. It is not caused solely by internal stresses in the component, such as in a metallic bilayer system. It is also not caused by reshaping of a material due solely to surface tension in the material. In order to cause folding, the actuating material must be adhered to the component and the volume change must generate a large enough stress such that the component folds out of plane. The degree of folding may be controlled by the amount of heat or force applied or by the amount (total volume as well as respective ratios of dimensions, e.g. thickness/cross sectional area, thickness/length, etc., and dimensions of actuating material relative to actuation directions) of actuating material used.

The images from FIG. 2 show examples of the process using 25 μm thick polyimide foils from which the 2D patterns were laser cut and onto which, silver nanoink pads (CCI-300) were laser printed to serve as actuation elements. For this particular example, the whole polyimide foil was then placed in an oven (150° C. for 10 minutes) in order to sinter the silver nanoink resulting in the out-of-plane folding, although the same effect can be achieved by local laser curing of the silver nanoink pads. As FIG. 2 shows, actuation takes place only for those elements that have a nanoink pad. Furthermore, by adjusting the amount and distribution of the deposited silver nanoink, it is possible to precisely and reproducibly control the folding angle of the out-of-plane actuation as shown for the elements elicited out-of-plane in FIG. 2(a). Besides bypassing all of the challenges inherent in traditional lithography, this is an inherently low temperature process, including both deposition and activation. Thus a wide array of material systems can now be integrated in spite of their previous incompatibilities stemming from high temperature processing requirements. In addition, pathways for local and sequential activation are opened providing enhanced flexibility for generating complex 3D components and devices. For example, the ability to control the folding action at an individual level, as shown in FIG. 2(b), would permit the triggering of "time-sequenced" out-of-plane folds as well as the generation of individual structures with multiple folds. As already mentioned, by controlling the thickness and distribution of the actuation layer it is possible to control the bending angle of each structure. In fact, large folding angles (up to 180°) have been demonstrated. Furthermore, the challenges stemming from instabilities due to temperature fluctuations are also surmounted, as the process relies on volumetric contraction of the transferred elements for deformation as opposed to a bi-metallic strip approach. Finally, the process is compatible with other LDW processes such as "lase-and-place" (Mathews et al., *Photonics Spectra*, 41(10), 70 (2007)), which allow the incorporation of functional components such as opto-electronic devices within the micro-assemblies prior to the folding step. This last point is very important since "lase-and-place" techniques are also capable of transferring thin layers of actuating elements such as piezoelectric and shape memory alloy films for reversible folding action, thus opening the possibility for producing "smart" (instead of passive) 3D micro-assemblies with active or dynamic shape control.

The process is suitable for providing engineering solutions for micro-electro-optical systems. For example, many micro-electro-optical systems require that light paths be "folded" out-of-plane. Because the process can fabricate and fold optical structures at arbitrary angles, as well as fabricate electronic structures, it could potentially allow an unprecedented level of integration in electro-optic systems, such as handheld Chem/Bio sensors and fiber optic communications equipment.

Perhaps the most important potential application of the process is in the area of artificial electromagnetic materials. These would include meta-materials, frequency selective surfaces, negative index materials, and radar absorbing materials, to name just a few. The process is capable of fabricating 3D structures with dimensions that are "sub-wavelength" for a large portion of the EM spectrum. For example, sub-wavelength structures arranged in periodic arrays result in unique electromagnetic behavior, and manipulating these sub-wavelength structures gives rise to surfaces with very specific electromagnetic properties. The process not only allows for the fabrication of the sub-wavelength structures, but also allows arbitrary orientation of these structures in 3D. This additional degree of freedom would make possible the development of artificial electromagnetic materials that display specific response (or lack of response) to changes in polarization or incident angle; responses that otherwise could not be achieved from a 2D structure. The fact that the process can be implemented on very large substrates, i.e. using "roll-to-roll" processes, might make possible the fabrication of low-cost, high performance artificial electromagnetic materials over very large areas.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A method comprising:
   depositing an actuating material onto a bendable component;
   applying heat to the actuating material, such that the volume of the actuating material changes causing the bendable component to bend,
   wherein the actuating material comprises a crosslinkable polymer and wherein heating the actuating material such that the volume of the actuating material changes causes the crosslinking of the polymer, or,
   wherein the actuating material comprises an ink comprising metal nanoparticles in an organic solution and wherein heating the actuating material such that the volume of the actuating material changes causes the evaporation of the organic solvent and sintering of the metal nanoparticles.

2. The method of claim 1, further comprising:
   partially excising a portion of a bendable substrate from the remainder of the bendable substrate to form the bendable component such that the bendable component can be folded independently from the remainder of the bendable substrate.

3. The method of claim 2, wherein a laser is used to excise the bendable component.

4. The method of claim 1, wherein the actuating material is deposited by a laser transfer process.

5. The method of claim 1, wherein a laser is used to heat the actuating material.

6. The method of claim 5;
   wherein the actuating material is deposited on a plurality of bendable components on a single substrate; and
   wherein the laser heats fewer than all of the deposits of actuating material.

7. The method of claim 1, wherein an oven is used to heat the actuating material.

8. The method of claim 1, further comprising:
   micromachining a score line in the bendable component before depositing the actuating material on the score line.

\* \* \* \* \*